Jan. 25, 1938.   J. Q. HOLMES   2,106,214
TOOL SUPPORT
Filed June 24, 1936   2 Sheets-Sheet 1

Jan. 25, 1938.  J. Q. HOLMES  2,106,214
TOOL SUPPORT
Filed June 24, 1936  2 Sheets-Sheet 2
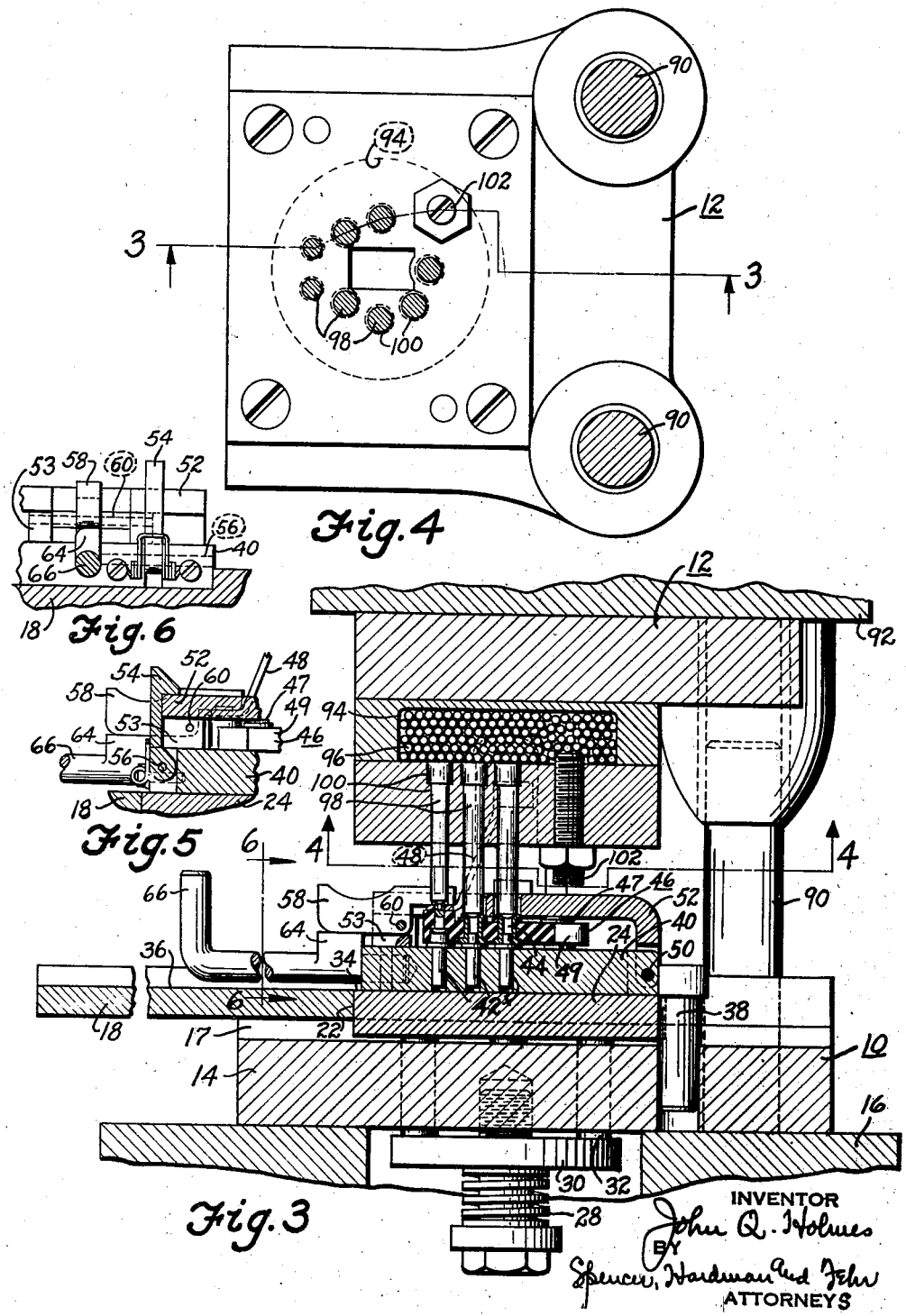
INVENTOR
John Q. Holmes
BY Spencer, Hardman and John
ATTORNEYS Patented Jan. 25, 1938

2,106,214

UNITED STATES PATENT OFFICE 2,106,214

TOOL SUPPORT

John Q. Holmes, Anderson, Ind., assignor to General Motors Corporation, Detroit, Mich., a corporation of Delaware Application June 24, 1936, Serial No. 86,996

12 Claims. (Cl. 218—0.5)

This invention relates to machine tools and more particularly to certain improvements in riveting tools.

In order to join the parts of an assembly by means of a plurality of rivets, the heading tools for the individual rivets are frequently mounted on a common support and are so correlated that they engage and head their respective rivets simultaneously. To obtain uniformly tightly set rivets, accurate longitudinal positioning of the tools is of the utmost importance since such adjustment controls the heading of the rivet shanks. However, accurate longitudinal adjustment of the tools alone does not assure that the rivets of any number of assemblies are uniformly tightly set, because the same type rivets usually vary slightly in length. Thus, assemblies frequently pass visual inspection, yet become loose when put to use.

It is among the objects of the present invention greatly to facilitate the longitudinal adjustment of a plurality of heading tools that are adapted to operate simultaneously on a plurality of rivets.

It is another object of the present invention to provide for slight longitudinal relative play between the tools to assure that prior to the actual heading of the rivets, all tools are forced into simultaneous engagement with their respective rivet shanks, even though the lengths of the rivets vary within usual limits.

It is another object of the present invention to provide for facile longitudinal readjustment of the tools in case any one or more rivets have assumed a different longitudinal location due to structural changes of the parts in a certain type of assembly, for instance.

These and other objects are accomplished by confining a mass of steel balls in a common support for the riveting tools which are longitudinally movable in the support and bear against the steel balls. Upon longitudinal adjustment of the tools, the confined steel balls are packed by means of a bolt which is manipulated into the mass of steel balls.

Further objects and advantages of the present invention will be apparent from the following description, reference being had to the accompanying drawings wherein a preferred embodiment of the present invention is clearly shown.

In the drawings:

Fig. 3 is a section taken on the lines 3—3 of Figs. 1 and 4.

Fig. 4 is a section taken on the line 4—4 of Fig. 3.

Fig. 5 is a fragmentary section taken on the line 5—5 of Fig. 1.

Fig. 6 is a fragmentary section taken on the line 6—6 of Fig. 3.

Figure 1:
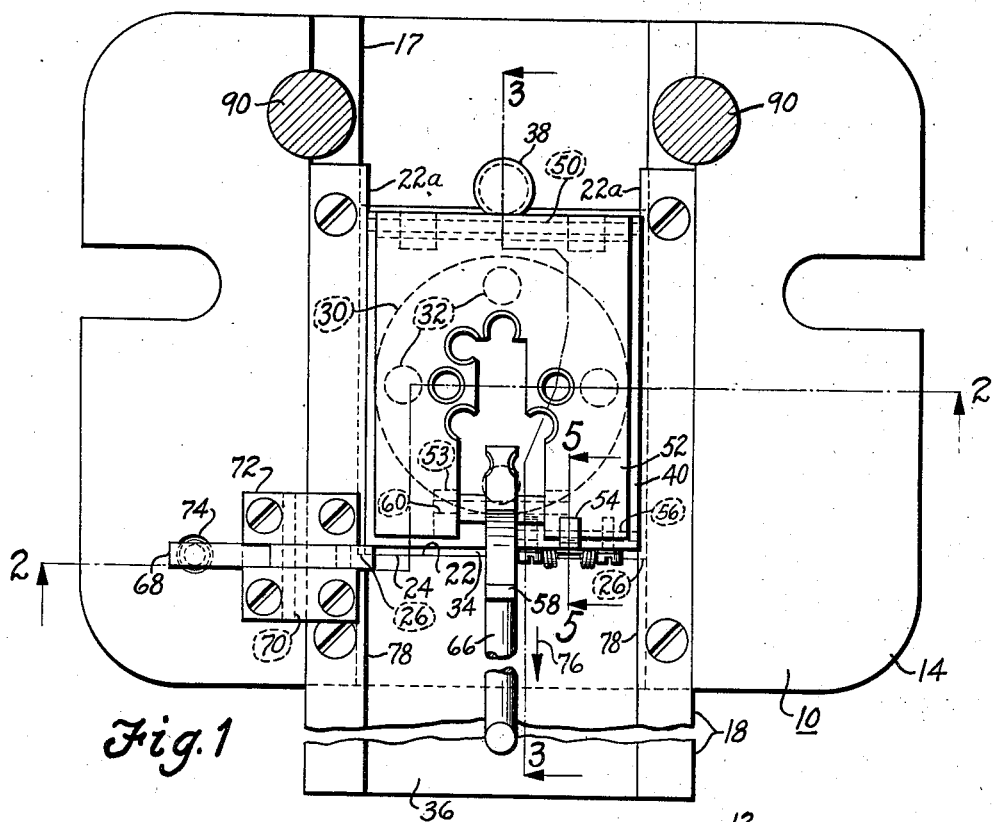
Fig. 1 is a plan view of part of a device which embodies the present invention.

Referring to the drawings, the illustrated device incorporates a work support 10 and a tool support 12. The work support includes a base 14 which is mounted on the bolster plate 16 of any conventional punch-press (not shown) and is longitudinally recessed at 17 to receive a guide plate 18 which is suitably secured to said base. One end of the guide plate 18 is recessed at 22 to receive and guide for vertical movement a support 24, having opposite shoulders 26 which are normally urged into engagement with the opposite legs 22a of the guide plate 18 by means of a compressed spring 28 through intermediation of a pad 30 and a plurality of posts 32. The support 24 is furthermore retained in said recess 22 by a pin 38 which projects from base 14. As shown in Fig. 3, the top surface 34 of support 24 is normally flush with the top surface 36 of the guide plate 18. Placed on top of the support 24 is a locator 40, having a plurality of pilot pins 42 which are adapted to register with all hollow rivets 44 that are inserted in the parts to be joined of an assembly 46. The parts to be joined in the present instance are contact members 47, a bracket 48 and a mounting 49. The rivet that is to secure bracket 48 to the mounting is partly hollow and bears with its preformed head against a pilot pin that enters a suitable recess in the mounting.

Figure 2:
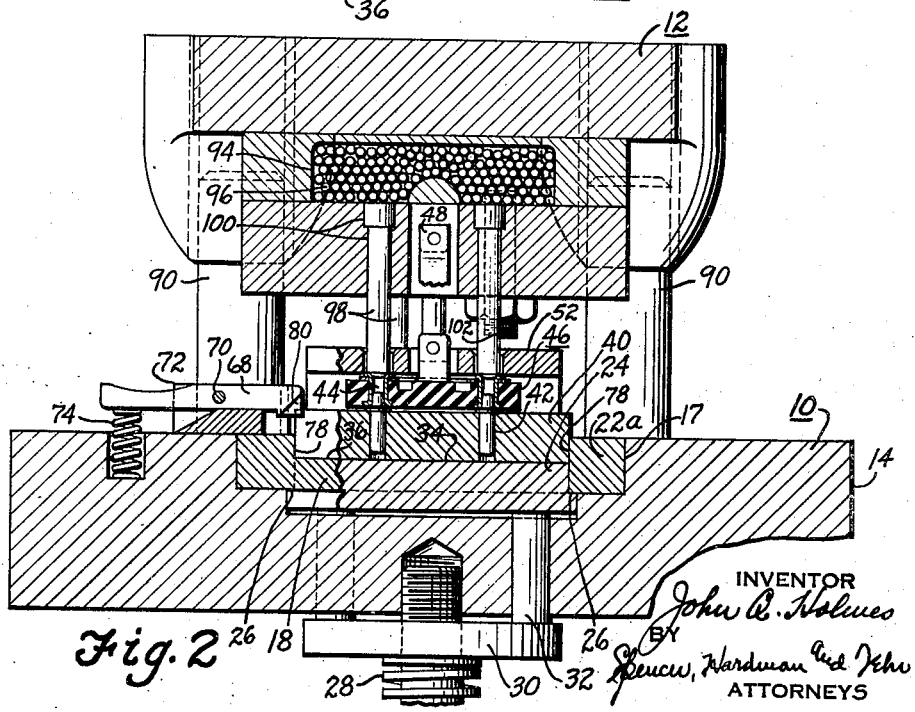
Fig. 2 is a section taken on the line 2—2 of Fig. 1.

Pivoted at 50 to the locator 40 is a retaining member 52, having suitably spaced projections engaging the contact members 47 when in the position shown in Fig. 3, in which said retaining member is arrested by a spring-urged pawl 54 (see Fig. 5), pivotally mounted at 56 upon the locating member 40. Another retaining member 58 is pivoted at 60 upon retaining member 52 and is adapted to hold the bracket 48 on the mounting 49. In order to lock member 58 in holding position, the same cooperates with a cam lug 64 of a handle 66 which is rotatably but longitudinally immovably mounted in the locator 40. The locator 40 is retained in operating position, i. e. in engagement with the pin 38, by means of a lever 68 which is pivoted at 70 to a bracket 72 on the base 14 and is normally urged into the retaining position shown in Fig. 2 by a compressed spring 74. In order to remove a riveted assembly 46 from the locator 40 and to place a new, loose assembly 46 thereon, the locator is removed from operating position by sliding the same on the top surface 36 of guide plate 18 in the direction of arrow 76 in Fig. 1. The locator is guided in a linear path by guide rails 78 which are provided by the guide plate 18. In order to remove the locator from operating position the operator has to depress the obstructing lever 68, as can be readily understood. After removal of a riveted assembly, a new assembly 46 is placed on the locator 40, whereby the same is preferably held inverted so that the loose rivets may not gravitate from the parts of the assembly. The locator 40 is then returned to horizontal position with the loose assembly on top, and the retaining members 52, 58 are rocked into retaining position and thereupon locked in the previously described manner. The locator 40 with a properly located assembly 46 thereon is then placed on the guide plate 18 and moved thereon into the operating position shown in Fig. 3. The obstructing lever 68 is cammed out of the path of movement of the locator into operating position upon cooperation between a cam surface 80 of said lever 68 and the locator.

Upstanding from the base 14 are pilots 90 which guide the tool support 12 for movement at right angles to the guide plate 18. This tool support is mounted on the reciprocable ram 92 of the punch press and provides a cavity 94 which contains a mass of steel balls 96. The cavity 94 is preferably circular, thereby eliminating, wherever possible, corners which tend to obstruct free relative shifting between the balls. A plurality of heading tools or punches 98 are received in accurately machined bores 100 of the support 12 and bear with one end against the steel balls 96. Threadedly received by the support 12 is a bolt 102 which enters the cavity 94 and is adapted to serve as a plunger in forcing the steel balls to fill out all available space in the cavity and to be tightly packed.

In initially adjusting the heading tools 98, the bolt 102 is sufficiently withdrawn from the cavity 94 to permit relatively free motion of the balls 96 therein. The entire tool support 12 is then lowered until the tools 98 are in heading engagement with the headed rivets of an assembly 46 on the locator 40. The rivets of this assembly have been previously headed in any suitable manner, preferably one at a time to insure their tightness. Obviously, some of the tools 98 will engage their respective rivets prior to the others during descent of the tool support, and then remain stationary while the tool support and other tools descend further. These stationary tools act then as plungers on the balls 96 and would pack the same, were it not for the fact that the non-engaging tools yield before the crowding balls. Thus, the shifting balls expedite movement of the non-engaging tools into engagement with their respective rivet heads. When all tools are in uniform heading engagement with their rivet heads and while they remain so engaged, the bolt 102 is manipulated into the mass of steel balls to pack the same sufficiently tight so as to prevent any but the slightest movement of any tool, and then only when a considerable force is exerted against the tool. The right degree to which the balls should be packed depends upon the resistance of the rivets against heading and is a matter for adjustment. The provision of the steel balls is primarily advantageous for quick, yet accurate initial longitudinal adjustment of the tools, and even for re-adjustment of these tolls in case any one or more rivets of a certain type of assembly have assumed a different longitudinal position due to structural changes of a part or parts of that assembly.

Even though the balls are packed to such an extent as to successfully resist appreciable simultaneous yielding of all tools when exerting their heading force, they allow for slight relative shifting of one or more of the tools. When the machine is in its retracted or idle position the head of the machine will carry the tools 98 with their shouldered portions in contact with the shouldered part of their bearings or bores 100 and in their lowermost positions. This state of affairs will continue during descent of the head and when one or more of the tools 98 contacts a rivet 44 such tools will be lifted from their seats in their lowermost positions. This lifting will compress or tighten the steel balls 96 within the cavity 94 against the end of the tool or tools that are not in engagement with their respective rivets. The shifting of the tools continues until all of the tools have come into contact with their rivets. As soon as all of the tools come into contact with their respective rivets, there occurs a pressure which is transmitted backward to the balls. In this manner an equal pressure is automatically applied to all of the tools, before simultaneous heading of all rivets takes place. Since the packed balls act somewhat like a contained fluid which forces a piston (tool) outwardly when the fluid is compressed by an inwardly moving piston (tool). Thus, the provision of the steel balls assures a uniform heading of the rivets of any number of assemblies, even though these rivets vary appreciably in length.

The compression of spring 28 is preferably slightly greater than the total maximum force which is exerted by the tools for heading the rivets. Consequently, the heading of the rivets of an assembly may take place in any depressed position of the support 24, depending upon the adjustment of the work-stroke of the tool carrying ram of the press.

It is to be understood that the benefits derived from the provision of steel balls may also be derived to some extent from other small, hard particles such as steel scrap, for instance. Consequently, the provision of hard particles other than steel balls falls fully within the scope of the present invention.

While the embodiment of the present invention as herein disclosed, constitutes a preferred form, it is to be understood that other forms might be adopted, all coming within the scope of the claims which follow.

What is claimed is as follows:

1. A device for heading rivets inserted in parts to be joined comprising, in combination, a locator for the parts and inserted rivets; riveting tools movable longitudinally relative to each other; and confined hard particles against which one end of each tool rests.

2. In a device of the character described, the combination of riveting tools movable longitudinally relative to each other; a confined mass of hard particles against which one end of each tool rests; and adjustable means for varying the confined mass of hard particles.

3. In a device of the character described, the combination of riveting tools movable longitudinally relative to each other; a confined mass of hard particles against which one end of each tool rests; and means for packing the confined particles.

4. In a device of the character described, the combination of a support providing a cavity; riveting tools mounted in the support for longitudinal movement relative to each other; hard particles in the cavity and against which one end of each tool rests; and adjustable means carried by the support and extending between the hard particles to vary the packed relation thereof.

5. In a device of the character described, the combination of a support providing a cavity; riveting tools mounted in the support for longitudinal movement relative to each other; hard particles in the cavity and against which one end of each tool rests; and means for packing the particles in the cavity.

6. In a device of the character described, the combination of riveting tools movable longitudinally relative to each other; a circularly confined mass of hard particles against which one end of each tool rests; and a threaded member suitably supported with respect to the hard particles to control the pressure of the balls against the tools.

7. In a device of the character described, the combination of a support providing a circular cavity; riveting tools mounted in the support for longitudinal movement relative to each other; hard particles in the cavity and against which one end of each tool rests and adjustable means carried by the support for increasing or decreasing the packed relation of the particles.

8. In a device of the character described, the combination of riveting tools movable longitudinally relative to each other; a confined mass of steel balls against which one end of each tool rests; and adjustable means cooperating with the balls for controlling the longitudinal movements of the tools.

9. In a device of the character described, the combination of a support providing a cavity; riveting tools mounted in the support for longitudinal movement relative to each other; hard particles in the cavity and against which one end of each tool rests; and movable means for entering the cavity to pack the particles therein.

10. In a device of the character described, the combination of a support providing a cavity; riveting tools mounted in the support for longitudinal movement relative to each other; hard particles in the cavity and against which one end of each tool rests; and a bolt threaded in the support and entering the cavity to pack the particles therein.

11. In mechanism of the class described, the combination of a movable support provided with a chamber; a plurality of plungers slidably mounted in the support and extending outwardly beyond the face of the support; a plurality of hard members located within the cavity to normally hold the plungers in their outward positions, said members permitting relative inward movement of the plungers when same engage a piece of work so as to equalize the pressure of the plungers on the work; and adjustable means carried by the support and extending between the hard member for regulating the inward movements of the plungers.

12. A device for heading rivets inserted in parts to be joined comprising, in combination; a locator for the parts and inserted rivets; riveting tools movable relative to each other; confined hard particles against which one end of each tool rests; and adjustable means suitably supported with respect to the particles for varying the relation of the confined particles.

JOHN Q. HOLMES.